(12) United States Patent
Schäfer et al.

(10) Patent No.: US 8,554,707 B2
(45) Date of Patent: Oct. 8, 2013

(54) METHOD FOR THE COMPUTER-ASSISTED CONTROL AND/OR REGULATION OF A TECHNICAL SYSTEM WHERE THE DYNAMIC BEHAVIOR OF THE TECHNICAL SYSTEM IS MODELED USING A RECURRENT NEURAL NETWORK

(75) Inventors: Anton Maximilian Schäfer, München (DE); Steffen Udluft, Eichenau (DE); Hans-Georg Zimmermann, Starnberg/Percha (DE)

(73) Assignee: Siemens Aktiengesellschaft, München (DE)

( * ) Notice: Subject to any disclaimer, the term of this patent is extended or adjusted under 35 U.S.C. 154(b) by 537 days.

(21) Appl. No.: 12/522,040

(22) PCT Filed: Dec. 19, 2007

(86) PCT No.: PCT/EP2007/064265
§ 371 (c)(1),
(2), (4) Date: Dec. 22, 2009

(87) PCT Pub. No.: WO2008/080864
PCT Pub. Date: Jul. 10, 2008

(65) Prior Publication Data
US 2010/0094788 A1    Apr. 15, 2010

(30) Foreign Application Priority Data
Jan. 2, 2007    (GB) .......................... 10 2007 001 025

(51) Int. Cl.
*G06E 1/00*    (2006.01)
*G06E 3/00*    (2006.01)
*G06F 15/18*   (2006.01)
*G06G 7/00*    (2006.01)

(52) U.S. Cl.
USPC .......................................................... 706/20

(58) Field of Classification Search
None
See application file for complete search history.

(56) References Cited

U.S. PATENT DOCUMENTS 5,857,321 A * 1/1999 Rajamani et al. ............ 60/39.27

FOREIGN PATENT DOCUMENTS

| DE | 19742902 A1 | 4/1999 |
|----|-------------|--------|
| DE | 69032557 T2 | 5/1999 |
| DE | 69033328 T2 | 5/2000 |
| DE | 102004011426 B3 | 5/2005 |
| WO | WO 03061318 A1 | 7/2003 |

OTHER PUBLICATIONS

Nonlinear system identification using recurrent networks: Lee, 1991, IEEE, 3065-0, pp. 2410-2415.*
'Solving partially observable reinforcement learning problems with recurrent neural networks': Schafer, 2005, Workshop Proc. of the European conference.*

(Continued)

*Primary Examiner* — Kakali Chaki
*Assistant Examiner* — Peter Coughlan

(57) ABSTRACT

A method for the computer-assisted control and/or regulation of a technical system is provided. The method includes two steps, namely modeling the dynamic behavior of the technical system with a recurrent neural network using training data, the recurrent neural network includes states and actions determined using a simulation model at different times and learning an action selection rule by the recurrent neural network to a further neural network. The method can be used with any technical system in order to control the system in an optimum computer-assisted manner. For example, the method can be used in the control of a gas turbine.

17 Claims, 3 Drawing Sheets

(56) References Cited

OTHER PUBLICATIONS

'Reinforcement learning with recurrent neural networks': Schafer, 2008, Dissertation.*

'A Neural Reinforcement Learning Approach to Gas Turbine Control': Scharfer, 2007, Proceedings of international Joint Conference on Neural Networks.*

'A Recurrent Control Neural Network for Data Efficient Reinforcement Learning': Schaefer, 2007, Proceedings of the 2007 IEEE Symposium on Approximate Dynamic Programming and Reinforcement Learning, pp. 151-157.*

'The Recurrent Control Neural Network': Schaefer, 2007, European Symposium on Artificial Neural Networks, pp. 319-324.*

D.E. Rumelhart, G.E. Hinton, and R.J. Williams, "Learn-ing internal representations by error propagation", in Parallel Distributed Processing: Explorations in the Microstructure of Cognition, D.E. Rumelhart and J.L.M. et al., Eds. Cambridge: MIT Press, 1986, vol. 1, pp. 318-362; Book; 1986; GB.

Leslie Pack Kaelbling; Michael L. Littman; Andrew W. Moore, Reinforcement Learning: A Survey, Journal of Artificial Intelligence Research 4 (1996) pp. 237-285; Magazine; 1996.

Xiaofeng Zhuang et al: "A novel approach for modeling cracking furnace serverity", Intelligent Control and Automation, 2004. WCICA 2004. Fifth World Congress on Hangzhou, China Jun. 15-19, 2004, Piscataway, NJ, USA, IEEE, US, vol. 1, pp. 250-253; Magazine.

Zhou Yifeng et al: "Fault detection and classification in chemical processes based on neural networks with feature extraction", ISA Transactions, Instrument Society of America. Pittsburgh, US, vol. 42, No. 4, Oct. 2003, pp. 651-664; Magazine.

Long-Ji Lin: "Reinforcement Learning for Robots Using Neural Networks", School of computer science, Carnegie Mellon University, Jan. 6, 1993, Pittsburgh, pp. 2-4; Magazine.

Thrun, Sebastian B.; Linden, Alexander: "Planning with an Adaptive World Model", Advances in Neural Information Processing Systems 3, Touretzky, D.S.; Lippmann, R. (Eds.)[Online] 1991, San Mateo, CA URL: http://www.ri.cmu.edu/pub_files/publ/thrun_sebastian_1991_1/thrun_sebastian_1991_1.pdf> [found on Mar. 18, 2008]; Book.

Jun Tani: "Model-Based Learning for Mobile Robot Navigation from the Dynamical Systems Perspective", IEEE Trans.System, Man and Cybernetics (Part B),Special Issue on Learning Autonomous Robots, vol. 26, 1996, pp. 421-436; Magazine.

Arie H; Ogata T; Jun T; Sugano S.: "Reinforcement learning of a continuous motor sequence with hidden states", Kluwer Academic Publishers, vol. 21, No. 10, Aug. 14, 2007; Book.

Bahman Kermanshahi, "Construction and Application of a neural network", JP, Shokodo Co. Ltd., Jun. 30, 1999, No. 4, pp. 42-45, 1st Edition.

"Experience-Based Imitation Using *RNNPB*", Ryunosuke Yokoya Et al., Sep. 14, 2006, pp. 1-4.

* cited by examiner

| DS | RCNN | | AHC | | Q-L | |
|---|---|---|---|---|---|---|
| 300 | 61 | 100 | 74 | 56 | 61 | 52 |
| 1000 | 387 | 33573 | 124 | 150 | 121 | 121 |
| 3000 | max | 66912 | 334 | 312 | 111 | 116 |
| 10000 | max | max | 1033 | 1554 | 148 | 163 |
| 30000 | max | max | 2988 | 9546 | 193 | 501 |
| 100000 | max | max | max | 75393 | 503 | 624 |

METHOD FOR THE COMPUTER-ASSISTED CONTROL AND/OR REGULATION OF A TECHNICAL SYSTEM WHERE THE DYNAMIC BEHAVIOR OF THE TECHNICAL SYSTEM IS MODELED USING A RECURRENT NEURAL NETWORK

CROSS REFERENCE TO RELATED APPLICATIONS

This application is the US National Stage of International Application No. PCT/EP2007/064265, filed Dec. 19, 2007 and claims the benefit thereof. The International Application claims the benefits of German application No. 10 2007 001 025.9 DE filed Jan. 2, 2007, both of the applications are incorporated by reference herein in their entirety.

FIELD OF INVENTION

The invention relates to a method for computer-aided control and/or regulation of the technical system and to a corresponding computer program product.

BACKGROUND OF INVENTION

In the control of complex technical systems it is often desirable that the action to be carried out on the technical systems is selected such that an advantageous desired dynamic behavior of the technical system is obtained. The dynamic behavior can however often not be predicted in a simple manner in complex technical systems, so that appropriate computer-aided prediction methods are needed in order to estimate the future behavior of the technical system and to select suitable actions for regulation or control of the technical system accordingly.

Nowadays the control of technical systems is often based on expert knowledge, i.e. the automatic regulation of the system is created on the basis that this expert knowledge. However approaches are also known in which technical systems are controlled with the aid of known methods of what is referred to as reinforcement learning, see document [2]. The known methods are however not generally applicable to any given technical systems and often do not supply sufficiently good results.

SUMMARY OF INVENTION

The object of the invention is thus to create a method for computer-aided prediction of the dynamic behavior of a technical system, which is generally valid for application to any given technical systems and delivers good results.

In the inventive method information is obtained about the dynamic behavior of the technical system for a number of points in time in each case by a state of the technical system and by an action carried out on the technical system, with each respective action leading at a respective point in time into a new state of the technical system at the next point in time. The technical system in this case can be designed in any given way so that the states can be any given measurable parameters of the technical system. The actions in this case are any given modifications to the technical system which are characterized by the modification of corresponding manipulated variables on the technical system. A state is preferably characterized here by a plurality of environmental and state variables, with each state variable representing a specific measured value of the technical system. The state is thus often a state vector. Similarly the action may comprise a plurality of manipulated variables to be modified which each form an entry in a corresponding action vector.

In the inventive method in a first step the dynamic behavior of the technical system is modeled with a recurrent neural network with the aid of training data comprising known states and actions at a number of points in time. The recurrent neural network here is fowled by a least one input layer comprising the states of the technical system and the actions performed on the technical system at the number of points in time, at least one hidden recurrent layer comprising recurrent states and at least one output layer comprising the states of the technical system at the number of points in time. The recurrence in the neural network is produced in this case by the temporal development of the system which is reflected in the hidden layer by the coupling of the hidden states at different points in time.

Subsequently in a second step and action selection rule is learned. The learning is undertaken in this case such that the recurrent neural network which was trained in a first step with the training data is coupled for a current and future points in time to a further neural network, with the further neural network comprising at least one input layer, at least one hidden layer comprising hidden states and at least one output layer. The input layer of the further neural network in this case comprises at a respective point in time at least one part of the hidden states of the recurrent neural network at the respective point in time and the output layer of the further neural network comprises at a respective point in time the action carried out on the technical system at the respective point in time. The further neural network thus assumes the task of optimum control of the technical system in respect of the future actions, taking account of the model dynamics of the technical system which was undertaken in the first step.

In a preferred embodiment the action selection rule is learned in accordance with an evaluation function which takes into account one or more criteria in relation to the state of the technical system and/or the actions carried out on the technical system and/or which is learned in the step of modeling the dynamic behavior of the technical system.

Finally in the inventive method with the recurrent neural network which is coupled to the further neural network and with which the action selection rule was learned, states of the technical system and/or actions, preferably optimum actions to be carried out on the technical system are determined. The technical system can then be regulated or controlled accordingly on the basis of the states or actions determined. It has been shown in this case that this type of network architecture makes possible data-efficient learning of the dynamic behavior of a technical system. Data efficiency is of great importance here since in most technical systems the available or relevant data material is greatly limited. In the specific description the inventive method has been compared with known learning methods, using the example of the cart pole problem, and it has been shown that the inventive method delivers very good results by comparison with the known methods.

In an especially preferred embodiment a feed-forward network is used as the further neural network in the inventive method in which the neurons of the hidden layers are not coupled back in time.

In a further variant of the invention the evaluation function will be selected such that it parameterizes an optimum dynamic behavior of the technical system. In this way, by the appropriate choice of the evaluation function, the optimum control of the technical system can be realized. In this case the evaluation function can for example be represented by a cost function to be optimized.

As already explained above, the states and the actions of the technical system preferably feature a number of variables. Similarly the hidden states of the recurrent or of the further neural network preferably also consist of a number of hidden variables. In particular in this case the number of the hidden variables of a hidden state of the recurrent and/or of the further neural network is smaller than the number of the environment variables of a state of the technical system. The number of hidden states in this case is preferably selected such that the method on the one hand is efficient as regards data and on the other hand still delivers good results.

In the modeling of the dynamic behavior of the technical system by the recurrent neural network, in the first step of the inventive method, in an especially preferred embodiment the error between the states defined by the recurrent neural network and the states of the training data is minimized.

In an especially preferred embodiment the inventive method is used in order to model a non-linear dynamic behavior of a technical system with the method and/or to learn a non-linear action selection rule.

In a further embodiment of the inventive method a back propagation method is employed for modeling the dynamic behavior of the technical system with the recurrent neural network in the first step of the method and/or for learning the action selection rule in the second step of the method. Such back propagation methods are sufficiently well known from the prior art and in particular the method described in the publication [1] is used here.

The recurrent neural network with which the dynamic behavior of the technical system is modeled is preferably a network with dynamically consistent temporal unfolding, taking into consideration future states and actions, which is referred to as a recurrent neural network with dynamically consistent overshooting. In such a network of the actual predictions of the network are used in the output layer as a substitute for future inputs in the input layer.

In an especially preferred embodiment of the inventive method the modeling of the technical system with the recurrent neural network is represented by the following equations:

$$s_\tau = \tanh(Ip_\tau + Da_\tau + \theta)$$
$$x_{\tau+1} = Cs_\tau$$
with
$$p_\tau = As_{\tau-1} + Bx_\tau$$
$$\sum_t \sum_\tau (x_\tau - x_\tau^d)^2 \to \min_{A,B,C,D,\theta}$$

with the range of values of $\tau$ comprising a predetermined number m of time steps before the time t and a predetermined number n of time steps after the time t;

with $t \in \{m, \ldots, T-n\}$, with T being the number of times for which training data is present;

with $x_\tau$ representing the state of the technical system determined by the recurrent neural network at time $\tau$;

with $x_\tau^d$ representing the state of the technical system at a time $\tau$ in accordance with the training data;

with $a_\tau$ representing the action at time $\tau$;

with $s_\tau$ and $p_\tau$ representing the hidden state at time $\tau$ of the hidden layer of the recurrent neural network;

with I being the unity matrix and A, B, C, D being matrices to be determined and $\theta$ being a bias to be determined.

As a result the corresponding matrices A, B, C, D and the corresponding bias $\theta$ are determined with the equations, which are selected such that the quadratic error between predicted and actual states is minimized.

In the second step finally the matrices A, B, C and D as well as the parameter $\theta$ are recorded, and the learning of the reward rule is then preferably undertaken with the aid of the following equations:

$$s_\tau = \tanh(Ip_\tau + Da_\tau + \theta)$$
$$R_{\tau+1} = Gh(Cs_\tau) \text{ for all } \tau > t$$
with $p_\tau = As_{\tau-1} + Bx_\tau$
and $a_\tau = f(F \tanh(Ep_\tau + b))$ for all $\tau > t$
$$\sum_t \sum_{\tau > t} c(R_\tau) \to \min_{E,F,b}$$

with G being a matrix and h a given activation function, which map the state $x_{\tau+1}$ of the technical system onto a state relevant for the cost function $c(\bullet) R_{\tau+1}$;

with f being a given activation function;

with E and F being matrices to be determined and b being a bias to be determined.

As already mentioned, the functions f and h can be any given activation functions, in particular they can also represent the identity mapping.

The inventive method can be employed for any given technical systems. One application is a turbine for example, especially a gas turbine.

The technical system is controlled such that at the start of the control initially all steps of the inventive method except for the actual action selection step will be executed and subsequently the recurrent neural network coupled with the further neural network thus produced with learned action selection rules will be used to select the actions which are executed for control of the technical system. The control rules will thus be established once and not modified any further during the control of the technical system.

Alternately it is possible, during the execution of the control of the technical system, for all steps of the inventive method are carried out at regular intervals (except for the actual action selection), with the new states and actions produced during the control being taken into consideration in the execution of these steps as new and/or further training data. After the execution of these steps of the inventive method the recurrent neural network coupled to the further neural network will then be used with the learned action selection rule for selecting further actions. In this way and online learning of the regulation is guaranteed during the control of the technical system.

As well as the method described above, the invention further relates to a computer program product with program code stored on a machine-readable medium for executing the inventive method when the program runs on a computer.

BRIEF DESCRIPTION OF THE DRAWINGS

Exemplary embodiments of the invention are explained in detail below with reference to the enclosed figures.

The figures show.

DETAILED DESCRIPTION OF INVENTION

The inventive method will be described in detail below. The method is able to be used here with any given type of technical system of which the dynamic behavior is able to be described by a state space X and an action space A with a (stochastic) transition function P ($x_t$, $a_t$, $x_{t+1}$). In this case $x_t$, $x_{t+1} \in X$ are states of the technical system at the times t or t+1, with each state being characterized by a plurality of state and environment variables. These environment variables in such cases are measurable state variables of the technical system, for example the gas pressure, the gas temperature, combustion chamber accelerations and the like in a gas turbine. The actions $a_t \in A$ are in this case modifications of manipulated variables of the technical system at time t which in their turn have an influence on later states of the technical system. Like the state $x_t$, the action $a_t$ can also comprise a plurality of action variables and an action can thus be characterized by the modification of a number of manipulated variables. An example of a manipulated variable able to be modified on a technical system is the setting of valves in a gas turbine. Often the technical systems are also designed so that the state space and the action space intersect, i.e. that a manipulated variable in the technical system also characterizes the state of the technical system.

The above description of the technical system with the aid of a state space X, and actions space A and a stochastic transition function P corresponds to the Markov Decision Process (MDP) known from the prior art. It is thus assumed that the technical system can be described with such a process. A reward or cost function c: $X \times A \rightarrow R$ exists for this process, with R representing a space of the rewards which the system receives for selecting an action $a_t$ in state $x_t$. The objective is now to determine an optimum rule $\Pi: X \rightarrow A$ which maximizes the expected accumulated or average reward function c for each state $x_t$. The maximization of the reward function c corresponds in this case to a possible design of an action selection rule as is defined in the claims. The reward function is in particular defined so that it reflects desired characteristics of the technical system, with the optimum being reached when the function is at its maximum. In the simplest case the cost function could for example be an advantageous desired state of the technical system which is optimal when it exhibits its maximum value. It is assumed below that the technical system is a deterministic Markov Decision Process with discrete time steps, with the state spaces X and A being continuous.

Figure 1:
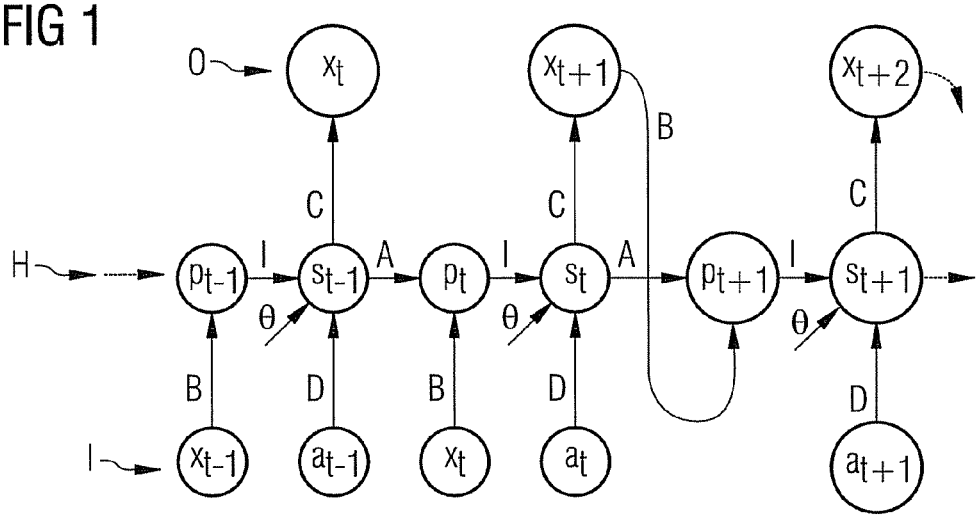
FIG. 1 a schematic diagram which shows the modeling of the technical system with a recurrent neural network in accordance with one exemplary embodiment of the invention.

In accordance with the invention a Markov Decision Process is modeled with a recurrent neural network RNN, by which a mapping of the dynamic behavior of the technical system, i.e. of the transmission function P(•), is undertaken by a high-dimensional non-linear system equation. The recurrent neural network RNN used in the variant of the invention described here is shown in this case in FIG. 1. The recurrent neural network comprises an input layer I which shows the states and the actions at the individual times. For example the states $x_t$ as well as the actions $a_{t-1}$, $a_t$, $a_{t+1}$ are reproduced in FIG. 1. The input layer is coupled to a hidden layer H via corresponding matrices B and D, which will be defined in greater detail below. The hidden layer features hidden states for each point in time, with FIG. 1 showing the states $p_{t-1}$, $s_{t-1}$, $p_t$, $s_t$, $p_{t+1}$ and $s_{t+1}$ as typical examples. The hidden layer H is redundant in this case since the individual hidden states are coupled to each other, a fact which is reflected by corresponding matrices I (corresponds to the unity matrix) and A and also a bias $\theta$ in FIG. 1. The recurrent neural network of FIG. 1 also features an output layer O which is foamed by the states of the technical system, with the states $x_t$, $x_{t+1}$ and $x_{t+2}$ being reproduced in FIG. 1. These states are coupled in this diagram to the hidden states $s_{t-1}$, $s_t$ and $s_{t+1}$ by a matrix C in each case.

The neural network according to FIG. 1 is a neural network with dynamically consistent overshooting. This means that in the modeling of the neural network not only times ti in the past, but also times $\tau$ in the future will be taken into account and the own predicted states of the network will be used in the output layer as inputs for future states in the input layer. The parameter $\tau$ is restricted by the length of the previous unfolding m and the length of the so-called overshooting n, so that the following applies: $\tau \in \{t-m, \ldots, t+n\}$ for all observed times $t \in \{m, \ldots, T-n\}$, with T representing the number of available times for which training data for learning the neural network is present. The overshooting is produced from FIG. 1 by the fact that future times $\tau > t$ are also taken into account in the modeling of the technical system by the neural network. Since these future times are not known, the states output via the network in the output layer will again also be used as input the next time step. This is shown in FIG. 1 for point in time t+1 at which the output state $x_{t+1}$ is once again fed to the hidden state $p_{t+1}$ of the hidden layer.

In the embodiment of the invention described here a sequence of states $x_\tau$ and actions $a_\tau$ is thus created on the input side of the recurrent neural network, with the network being unfolded temporally at a predefined interval which takes into account the past and the future. Mathematically the recurrent neural network of FIG. 1 can be described by the following equations, with the above-mentioned matrices I, A, B, C, D as well as the bias $\theta$ being contained in the equations.

$$s_\tau = \tan h(Ip_\tau + Da_\tau + \theta)$$

$$x_{\tau+1} = Cs_\tau$$

with $p_\tau = As_{\tau-1} + Bx_\tau$

The state $p\tau$ is referred to here as a pre-state which aggregates the information from a previously hidden state $s\tau-1$ and from the external state $x\tau$. The non-linearity in the hidden layer is expressed here with the tangens hyperbolicus. The pre-state $p\tau$ has the same dimension as the hidden state ST and is connected to the latter via the identity matrix I which will not be learned during the training of the neural network. The hidden state $s\tau$ has as its input an action at is used for calculation of the next expected state xz+1 of the technical system Matrix D is an additional matrix with suitable dimension which takes into account the influence of the actions at on the state ST. The actions at are also provided to the neural network RNN as future inputs (τ>t) since they do not directly influence the dynamics of the technical system and are thus not to be learned by the network. To cover a plurality of possible states in the state space X of the technical system, the recurrent neural network for modeling the technical system should be modeled with training data in which the actions at are selected at random. Otherwise the learned dynamic can be dependent under some circumstances on a specific rule.

The aim of the inventive method is now to combine a neural network of FIG. 1 learned with training data with reinforcement learning for learning the above-mentioned optimum rule Π. This is achieved in accordance with the invention by the recurrent neural network of FIG. 1 being combined with a further so-called control network, by which the above reward function c will be implemented in the neural network.

In the embodiment described here the additional control network is a three-layer neural feed-forward network with an input layer, a hidden layer and an output layer. Even if further more complex topologies were possible, any given type of control function can be modeled with the model described here. Since the optimum action $a_\tau$ is to be predicted the control network will only be coupled to the recurrent neural network for times lying in the future (i.e. τ>t). For the preceding temporal unfolding (i.e. τ<t) the actions previously listed are used in the neural network.

Figure 2:
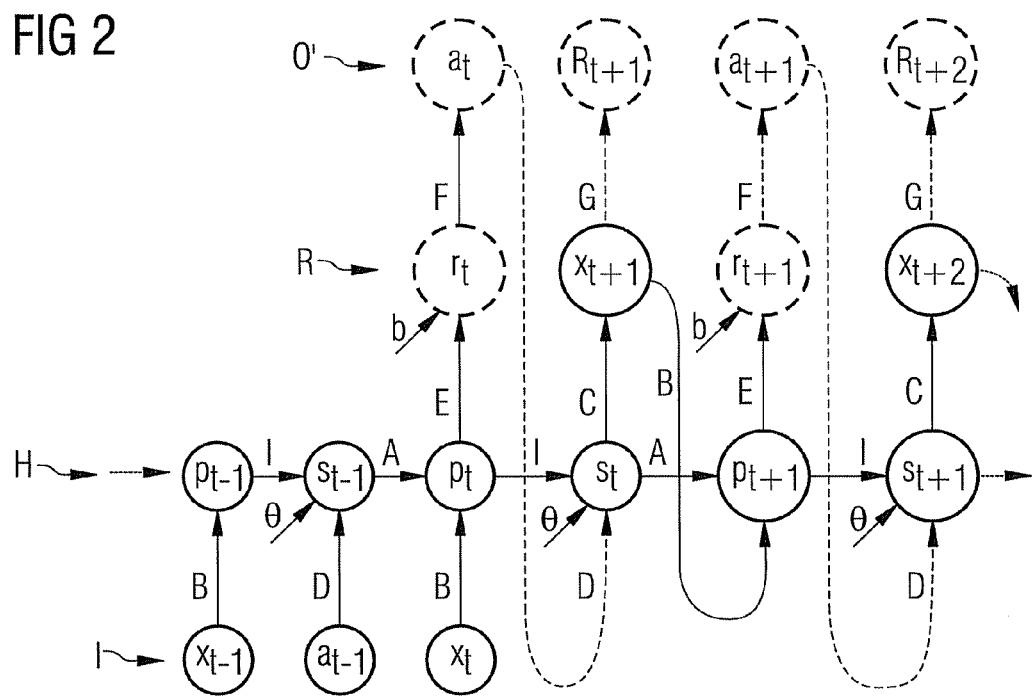
FIG. 2 a schematic diagram which reflects the learning of an action selection rule by the recurrent neural network of FIG. 1 in combination with a feed-forward network in accordance with an exemplary embodiment of the invention.

FIG. 2 shows the recurrent neural network coupled to the further feed-forward network which will subsequently be referred to as the RCCN (Recurrent Control Neural Network). The parts of the network which relate to the feed-forward network are shown by dashed lines in the figure. The control network uses as its input layer the hidden states $P_t$, $P_{t+1}$, ..., etc. which are coupled to a hidden layer R with corresponding states $r_t$, $r_{t+1}$ etc. The hidden states $r_\tau$ are coupled in this case to the states $p_\tau$ via a matrix E as well as a bias b, i.e. the following applies:

$$r_\tau = \tan h(Ep_\tau + b)$$

The hidden states $r_\tau$ are further coupled via a matrix F to the future actions $a_\tau$ to be modeled. In addition there exists a matrix G, which couples future states $X_{t+1}$, $X_{t+2}$ etc. to states $R_{t+1}$. $R_{t+2}$ etc., with the latter being relevant states for the calculation rule.

The inventive neural network RCNN must fulfill two different tasks On the one hand it must identify the dynamics of the underlying technical system and on the other it must achieve an optimum control of the technical system with the aid of a corresponding choice of actions or reward rules. The network is thus trained in two consecutive steps, namely a first step for learning the recurrent neural network with training data and a second step for learning a reward rule by coupling the recurrent neural network to a feed-forward network. This inventive approach differs from the conventional methods in which a combined learning of both tasks is attempted in one step.

In the first step of the inventive method the dynamics of the underlying Markov Decision Process are first modeled, which correspond to the dynamic behavior of a technical system. The network RCNN will consequently be reduced to a recurrent neural network RNN with dynamically consistent overshooting. This first step is represented mathematically by the following equations:

$$s_\tau = \tanh(Ip_\tau + Da_\tau + \theta) \quad (1)$$

$$x_{\tau+1} = Cs_\tau \quad (2)$$

$$\text{with } p_\tau = As_{\tau-1} + Bx_\tau \quad (3)$$

$$\sum_t \sum_\tau (x_\tau - x_\tau^d)^2 \to \min_{A,B,C,D,\theta} \quad (4)$$

The last equation in this case represents the task of training in which the result to be achieved is that a state $x_\tau$, which is defined by the current neural network, matches the state $x_\tau^d$ of the training data as well as possible. A minimization of the quadratic error in relation to the matrices A, B, C and D and the bias θ are undertaken, which represent the parameters of the recurrent neural network to be defined.

After the first step of the modeling of the dynamics of the technical system, the matrices A, B, C and D defined in this step as well as the bias θ are recorded, i.e. their weights are not modified during further training. The matrices E and F as well as the bias b are now activated, which is shown in FIG. 2. These are the only parameters during the second step of learning the reward rules. In this learning step the recurrent neural network does not receive any future actions as external inputs but these actions are learnt with the feed-forward network taking into consideration the reward function. In addition for previous time steps τ<t the output cluster $x_\tau$ are omitted since they are only needed for modeling the dynamics in the first step. For future time steps τ>t of the network the error function in accordance with equation (4) is replaced by the reward or cost function c(•), which is specified further below in equation (9). This is achieved in the architecture by the additional reward cluster $R_\tau$ which is linked to the output clusters by a problem-specific fixed matrix G, which depends on the above-mentioned reward function c(•), as well as the possible activation function h within the output cluster $X_\tau$. Thus the reward function c(•) is encoded by the network RCNN within the neural architecture. This means that the reward cluster $R_\tau$ does not only have to be calculated on the basis of the output cluster $x_\tau$ but that it can also be described more generally, which also makes possible more complicated network architectures. For example the reward function can be explicitly learnt, which is especially helpful when c(•) is not known or is only specified incompletely. This can be achieved by a further additional three-layer neural network with the output of the RCNN as inputs.

The weights of the feed-forward network are only adapted in accordance with the back-propagated reward of the reward clusters $R_\tau$ (τ>t). This corresponds to the idea that the second step of learning the action selection rule not only serves to identify the dynamics but also only to learn a rule which maximizes the reward with the dynamics of the system already having been modeled beforehand.

The second step of learning the reward rule can be reproduced mathematically by the following equations (5) to (9). In this step the matrices E and F as well as the bias b are learnt. The equations (5) to (9) are as follows:

$$s_\tau = \tanh(Ip_\tau + Da_\tau + \theta) \quad (5)$$

$$R_{\tau+1} = Gh(Cs_\tau) \text{ for all } \tau > t \quad (6)$$

$$\text{with } p_\tau = As_{\tau-1} + Bx_\tau \quad (7)$$

and $a_\tau = f(F \tanh(Ep_\tau + b))$ for all $\tau > t$ (8)

$$\sum_t \sum_{\tau > t} c(R_\tau) \to \min_{E,F,b}$$ (9)

Both in the modeling of the dynamics of the technical system in accordance with the equation (1) to (4) and also in the learning of the reward rules in accordance with equations (5) to (9) the recurrent neural network will be trained with the same training patterns T and with a back propagation method sufficiently known from the prior art in accordance with publication [1]. Each training pattern T in this case corresponds to a point in time to which are assigned corresponding training data in the form of the state of the technical system and the action carried out at this point in time. The step of learning the reward rules can be viewed here as backwards propagation of the error of the reward function $c(\cdot)$.

The embodiment of the recurrent control neural network RCNN described above combines in an ideal manner the advantages of a recurrent neural network RNN with dynamic overshoots for identification of the dynamics with a three-layer neural control network for learning the reward rules. In this way a high approximation accuracy is reached and dynamic systems can also be controlled in a very data-efficient manner. In addition the system can be scaled in a simple manner to higher dimensions and an only partially observable environment of states of the technical system can be reconstructed. In addition very good continuous state spaces and action spaces can be processed with the network.

The above embodiment of the recurrent neural network has been tested using the example of the cart pole problem sufficiently known in the prior art. The cart pole problem is depicted here in FIG. 3. It consists of a cart 1 which is moving in a horizontal direction in a hollow 2 which is delimited by vertical walls 2a. The position of the cart is described in this case in relation to the center of the hollow by the variable $\chi$. The cart balances on its upper side a pole 3, a position of which in relation to the vertical is described by the angle $\alpha$. The system will thus be described by the following four variables at the corresponding times $t=1, \ldots, T$:
$\chi_{,t}$:=Horizontal cart position
$\dot\chi_{,t}$:=Horizontal cart speed
$\alpha_{,t}$:=Angle between pole and the vertical
$\dot\alpha_{,t}$:=Angular speed of the pole The dynamics of this system is given by the following physical equations:

$$\begin{bmatrix} M+m & ml\cos\alpha_t \\ ml\cos\alpha_t & \frac{3}{4}ml^2 \end{bmatrix} \begin{bmatrix} \ddot{x}_t \\ \ddot{\alpha}_t \end{bmatrix} - \begin{bmatrix} ml\dot\alpha_t^2 \sin\alpha_t \\ mgl\sin\alpha_t \end{bmatrix} = \begin{bmatrix} F \\ 0 \end{bmatrix}$$ (10)

Figures 3, 4:
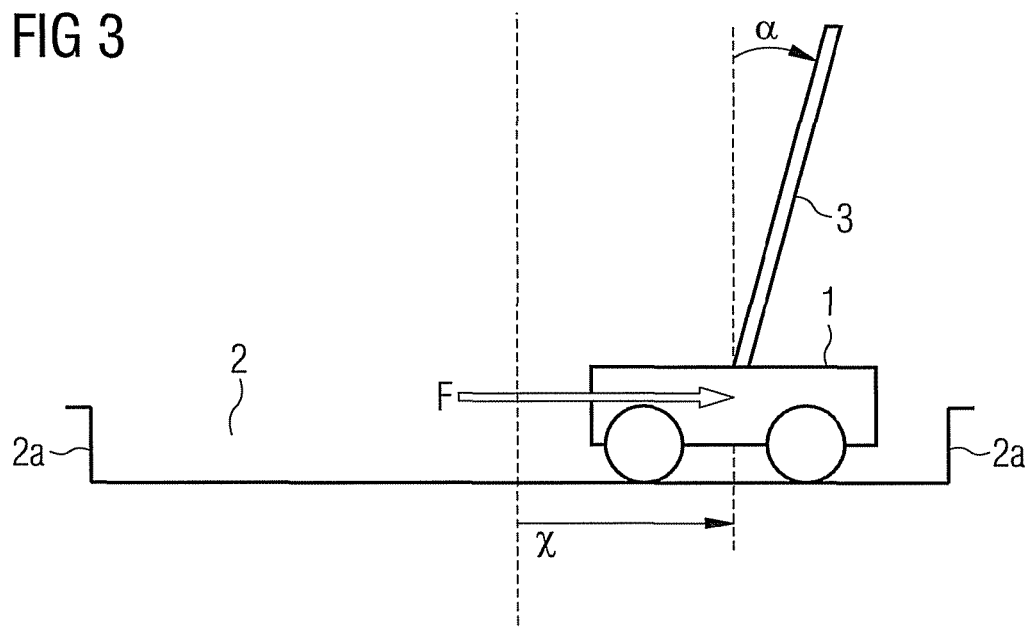
FIG. 3 a schematic diagram which shows the cart pole problem with which an exemplary embodiment of the inventive method has been tested.
FIG. 4 a table which compares results of the inventive method for the cart pole problem with results of other methods.

Here M is the mass of the cart 1 and m the mass of the pole 3. l corresponds to half the length of the pole, g is the gravitational acceleration and F is the force which is exerted on the cart in the horizontal direction. This force is also shown in FIG. 3.

The object of the cart pole problem is to balance the pole on the cart for the longest possible sequence of time steps without the cart hitting against the walls 2a. Possible actions are the displacement of the cart to the left or to the right with a constant force F. In accordance with the original cart pole problem the system was penalized with a negatively reinforcing signal if the cart touched one of the walls 2a or if the pole is tilted by more than 12°. In all other cases a reward of zero was awarded. The cart pole problem has been fully solved by known reinforcement learning methods but a large amount of training data was required for this in said methods. The solution of the cart pole problem on the basis of the inventive network RCNN is described below. A recurrent neural network with dynamically consistent overshoots has been used in this case with 10 steps having been unfolded in the past and 30 steps in the future. On the one hand this gives the network a memory which is sufficient to identify the dynamics of the system and on the other hand the network is given a future surplus which allows it to predict the consequences of selected actions. The dimension for the states of the hidden layer in the recurrent neural network was set to 20 neurons and the dimension for the hidden layer R of the control network was fixed at 40 neurons. As already described above the tangens hyperbolicus was used as an activation function of the cluster $a_r$ (see equation (8)). This restricted the action space of the network RCNN to $[-1,1]$.

For learning by the recurrent neural network data of different sizes was generated in accordance with the equation (10), with the actions (i.e. the force F) having been selected at random. A function was selected as a cost function which reflects the above objective of avoiding a tipping of the pole or of the cart hitting the walls 2a. The reward function was selected as follows:

$$c = \sum_t \sum_{\tau > t} -(g \cdot \chi_\tau + \alpha_\tau)^2$$ (11)

In this case g is a scaling factor which balances the error values of the two variables $\chi_\tau$ and $\alpha_\tau \cdot g=0.1$ was set in this case. Accordingly the matrix G was produced by equation (6) as follows:

$$G = \begin{bmatrix} 0,1 & 0 & 0 & 0 \\ 0 & 0 & 1 & 0 \end{bmatrix}$$ (12)

The identity function was used as activation function h according to equation (6). The recurrent neural network and also the feed-forward network were learned with the above-mentioned back propagation method in accordance with publication [1].

Discussed below are the results of the inventive method for resolving the cart pole problem compared to the results with other learning methods.

The inventive neural network RCNN was trained with different training data. The reward rule learned thereby in accordance with equation (11) was tested for the cart pole problem with this test determining the number of steps N which corresponds to the number of steps for how long the pole 3 is balanced on the cart 1, without the cart coming up against the walls 2a. To learn the reward rules three sets of data were used in each case 300, 1000, 3000, 10,000, 30,000 and 100,000 training values. Subsequently for each data set size the median ME and the average AV of the steps N was determined over 100 different random initializations of the cart and the pole during the test. The median in this case with a concatenation of all determined numbers N in ascending order is the mean value in this order. The average is the arithmetic mean of all determined numbers N. A maximum number of steps N was defined as max=100,000 which provided enough values for the cart pole problem to be resolved in this test.

FIG. 4 shows a table in which for the individual data set sizes, the median ME and the average AV for the inventive method with the network RCNN as well as for other known algorithms, namely the adaptive heuristic criticism algorithm AHC and the Q learning algorithm Q-L, are specified. It is known that the AHC delivers good results with the cart pole problem. The Q learning algorithm is a standard method for reinforcement learning.

Figure 5:
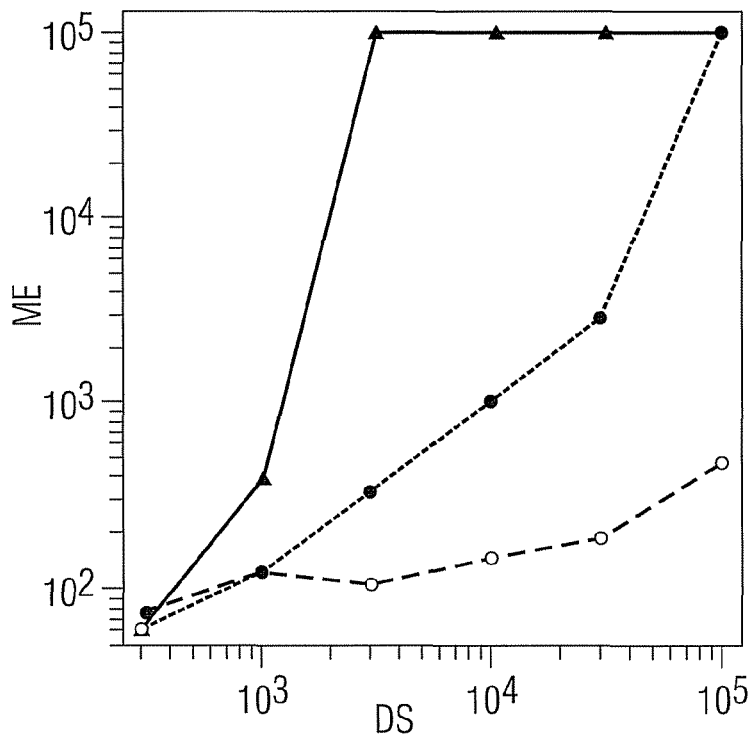
FIG. 5.
Figure 6:
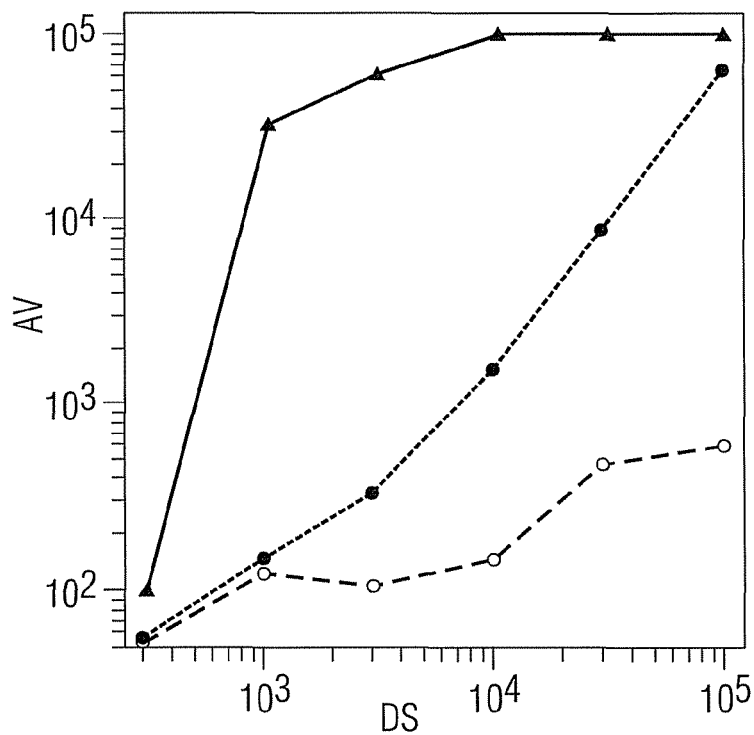
FIG. 6 diagrams which reproduce the results in accordance with the table from FIG. 4 in the form of graphs.

As emerges from the table depicted in FIG. 4, the inventive method with the neural network RCNN solves the cart pole problem very efficiently as regards data and markedly better than the other methods. In particular even with 1000 training values, the average number of steps for which the pole is balanced is very large, the number is around 33573. With one of the training data sets, even with a data set size of 1000, the reward rule could be learned. By comparison the AHC algorithm needs a data set size of at least 100,000 data values in order to find a good solution. The results of the Q learning method were even significantly worse and with this method the maximum number max of steps was not reached with any data set. By way of illustration the results of the table in FIG. 4 are also shown once again graphically with a logarithmic scale in FIG. 5 and FIG. 6. In FIG. 5 the data set size DS is plotted along the abscissa and the median ME for the three learning methods is indicated along the ordinate, with the inventive method RCNN being reproduced as a solid line, the AHC method as a dotted line and the Q learning method as a dashed line. The diagram shown in FIG. 6 corresponds to that shown in FIG. 5 with a single difference that the average AV is now plotted along the ordinate. It can clearly be seen from the two FIGS. 5 and 6 that the inventive method delivers better results than the prior art methods.

Although the inventive method was only tested in relation to the cart pole problem, it is not just restricted to this problem. It can especially be used with any given technical system in which given types of states can be measured and in which given types of actions can be carried out in the form of modification of manipulated variables.

Literature References:

[1] D. E. Rumelhart, G. E. Hinton, and R. J. Williams, "Learning internal representations by error propagation", in *Parallel Distributed Processing: Explorations in The Microstructure of Cognition*, D. E. Rumelhart and J. L. M. et al., Eds. Cambridge: MIT Press, 1986, vol. 1, pp. 318-362

[2] Leslie Pack Kaelbling; Michael L. Littman; Andrew W. Moore, Reinforcement Learning: A Survey, Journal of Artificial Intelligence Research 4 (1996) pp. 237-285

The invention claimed is:

1. A method for computer-aided control and/or regulation of a technical system comprising:

modeling a dynamic behavior of technical system, wherein the technical system is described by a state ($x_t$) of the technical system and an action ($a_t$) performed on the technical system for a plurality of points in time (t), with a respective action ($a_t$) leading at a respective point in time (t) into a new state ($x_{t+1}$) of the technical system at a next point in time (t+1); wherein the modeling of the dynamic behavior of the technical system uses a recurrent neural network using training data, the recurrent neural network includes a plurality of states ($x_t$) and a plurality of actions ($a_t$) determined using a simulation model at a plurality of different times (t), wherein the recurrent neural network is formed by a first input layer (I) including the plurality of states ($x_t$) and the plurality of actions ($a_t$) performed on the technical system for the plurality of different times (t), a hidden recurrent layer (H) including a first plurality of hidden states ($s_t$, $p_t$), and an output layer (O) including the plurality of states ($x_t$) for the plurality of different times (t);

learning an action selection rule by the recurrent neural network by coupling the recurrent neural network to a further neural network for a current time and future times, wherein the further neural network comprises a feed-forward network that includes a second input layer, a second hidden layer (R) including a second plurality of hidden states ($r_t$) and a second output layer (O'), wherein the further neural network uses as its second input layer a respective part of the first plurality of hidden states ($p_t$) of the hidden recurrent layer (H) at a respective point in time (t), which is coupled to the second hidden layer (R), which is coupled to the second output layer (O') that comprises a predicted action ($a_t$) to be performed on the technical system at the respective point in time, the predicted action ($a_t$) fed forward to the hidden state ($s_t$) of the hidden recurrent layer (H) such that the predicted actions learned by the further neural network rather than externally input future actions are used for the learning the actin selection rule; and determining the state of the technical system and the action to be performed on the technical system by the recurrent neural network coupled to the further neural network using a plurality of learned action selection rules.

2. The method as claimed in claim 1, wherein the action selection rule is learned using an evaluation function which takes into account a criteria in relation to the plurality of states and/or the plurality of actions performed on the technical system.

3. The method as claimed in claim 2, wherein the evaluation function is selected based on an optimum dynamic behavior of the technical system.

4. The method as claimed in claim 3, wherein the evaluation function is represented by a cost function to be optimized.

5. The method as claimed in claim 1, wherein the state of the technical system includes an environment variable and/or the action to be performed on the technical system includes an action variable and/or a hidden state of the recurrent neural network and/or of the further neural network includes a hidden variable.

6. The method as claimed in claim 5, wherein a number of the hidden variables of a hidden state of the recurrent neural network and/or of the further neural network is less than a number of the environment variables of the state of the technical system.

7. The method as claimed in claim 1, wherein during the modeling of the recurrent neural network an error between the plurality of states and a plurality of states of the training data is minimized.

8. The method as claimed in claim 1, wherein a non-linear dynamic behavior of the technical system is modeled during the modeling and/or a non-linear action selection rule is learned during the learning.

9. The method as claimed in claim 1, wherein during the modeling and/or during the learning a back propagation method is used.

10. The method as claimed in claim 1, wherein the recurrent neural network is a network including dynamically consistent overshooting which takes into account a plurality of future states and a plurality of future actions.

11. The method as claimed in claim 1, wherein the modeling of the dynamic behavior of the technical system using the recurrent neural network is represented by the following equations:

$$s_\tau = \tanh(Ip_\tau + Da_\tau + \theta)$$

$$x_{\tau+1} = Cs_\tau$$

with $p_\tau = As_{\tau-1} + Bx_\tau$ $$\sum_t \sum_\tau (x_\tau - x_\tau^d)^2 \to \min_{A,B,C,D,\theta}$$

wherein τ represents a range of values which includes a predetermined number m of time steps before the time t and a predetermined number n of time steps after the time t, wherein t∈{m, . . ., T−n}, with T being the number of times for which training data is present, wherein $X_\tau$ represents the state of the technical system determined by the recurrent neural network at the point in time τ, wherein $X_\tau^d$ represents the state of the technical system at time τ in accordance with the training data, wherein $a_\tau$ represents the action at time τ, wherein $s_\tau$ and $p_\tau$ represent the hidden state at time τ of the hidden layer of the recurrent neural network, and wherein I is a unity matrix and A, B, C, D are matrices to be determined and θ is a bias to be determined.

12. The method as claimed in claim 11, wherein the learning of the action selection rule is represented by the following equations:

$$s_\tau = \tanh(Ip_\tau + Da_\tau + \theta)$$

$$R_{\tau+1} = Gh(Cs_\tau) \text{ for all } \tau > t$$

with $p_\tau = As_{\tau-1} + Bx_\tau$ and $a_\tau = f(F\tanh(Ep_\tau + b))$ for all $\tau > t$ $$\sum_t \sum_{\tau>t} c(R_\tau) \to \min_{E,F,b}$$

wherein G is a matrix and h is an activation function which maps a state $X_{\tau+1}$ of the technical system onto a state C(•) relevant for a cost function $R_{\tau+1}$, wherein f is a given activation function, and wherein E and F are matrices to be determined and b is a bias to be determined.

13. The method as claimed in claim 1, wherein the technical system is a turbine.

14. The method as claimed in claim 13, wherein the technical system is a gas turbine.

15. The method as claimed in claim 1, wherein at the start of a control function the modeling, the learning, and the determining are performed and the recurrent neural network coupled to the further neural network thus produced is used along with the learned action selection rule to determine the plurality of actions.

16. The method as claimed in claim 1,
wherein during the control function the modeling, the learning, and the determining are executed at a regular interval,
whereby during the execution a plurality of new states and a plurality of new actions produced are taken into account as new training data and/or additional training data, and
whereby after the execution the recurrent neural network produced and coupled to the further neural network is used with the learned action selection rule to select a plurality of further actions.

17. A computer program product with program code stored on a non-transitory machine-readable medium, when the program executes on a processor of a computer, the program comprising:
modeling a dynamic behavior of a technical system, wherein the technical system is described by a state ($x_t$) of the technical system and an action ($a_t$) performed on the technical system for a plurality of points in time (t), with a respective action ($a_t$) leading at a respective point in time (t) into a new state, ($x_{t+1}$) of the technical system at a next point in time (t+1); wherein the modeling of the dynamic behavior of the technical system uses a recurrent neural network using training data, the recurrent neural network includes a plurality of states ($x_t$) and a plurality of actions ($a_t$) determined using a simulation model at a plurality of different times (t), wherein the recurrent neural network is formed by a first input layer (I) including the first plurality of states ($x_t$) and the first plurality of actions ($a_t$) performed on the technical system for the plurality of different times (t), a hidden recurrent layer (H) including a plurality of hidden states ($s_t$, $p_t$), and an output layer (O) including the first plurality of states ($x_t$) for the plurality of different times (t);
learning an action selection rule by the recurrent neural network by coupling the recurrent neural network to a further neural network for a current and future times, wherein the further neural network comprises a feedforward network that includes a second input layer, a second hidden layer (R) including a second plurality of hidden states ($r_t$) and a second output layer (O'),
wherein the further neural network uses as its second input layer a respective part of the first plurality of hidden states ($p_t$) of the hidden recurrent layer (H) at a respective point in time (t), which is coupled to the second hidden layer (R), which is coupled to the second output layer (O') that comprises a predicted action ($a_t$) to be performed on the technical system at respective point in time, the predicted action ($a_t$) fed forward to the hidden state ($s_t$) of the hidden recurrent layer (H) such that the predicted actions learned by the further neural network rather than externally input future actions are used for the learning the actin selection rule; and
determining the state of the technical system and the action to be performed on the technical system by the recurrent neural network and coupled to the further neural network using a plurality of learned action selection rules.

* * * * *